(12) United States Patent
Powell

(10) Patent No.: US 11,204,152 B2
(45) Date of Patent: Dec. 21, 2021

(54) ILLUMINATION DEVICE HAVING REFLECTOR WITH CONCAVE AND CONVEX SYMMETRICAL SURFACES

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 12 days.

(21) Appl. No.: 16/655,129

(22) Filed: Oct. 16, 2019

(65) Prior Publication Data

US 2021/0048167 A1 Feb. 18, 2021

Related U.S. Application Data

(60) Provisional application No. 62/887,540, filed on Aug. 15, 2019.

(51) Int. Cl.

| *F21V 7/09* | (2006.01) |
| *F21V 3/04* | (2018.01) |
| *G02B 5/10* | (2006.01) |
| *F21V 13/02* | (2006.01) |
| *G03B 15/05* | (2021.01) |
| *F21Y 115/10* | (2016.01) |

(52) U.S. Cl.
CPC ............ *F21V 7/09* (2013.01); *F21V 3/049* (2013.01); *F21V 13/02* (2013.01); *G02B 5/10* (2013.01); *G03B 15/05* (2013.01); *F21Y 2115/10* (2016.08)

(58) Field of Classification Search
CPC ............ F21V 7/0025; F21V 7/04; F21V 7/09
See application file for complete search history.

(56) References Cited

U.S. PATENT DOCUMENTS 2,240,179 A * 4/1941 Doane ................. F21S 8/04
362/225
4,065,667 A * 12/1977 Ruud ................... F21S 8/033
362/217.16

(Continued)

FOREIGN PATENT DOCUMENTS

| CN | 203745781 U | 7/2014 |
| WO | 2018096041 A1 | 5/2018 |

OTHER PUBLICATIONS

"International Search Report and Written Opinion Issued in PCT Application No. PCT/US20/038571", dated Sep. 16, 2020,16 Pages.

*Primary Examiner* — Ismael Negron
(74) *Attorney, Agent, or Firm* — Alleman Hall Creasman & Tuttle LLP

(57) ABSTRACT

An illumination device including a light source and a reflector with a pair of vertically opposed symmetrical reflective surfaces and a pair of horizontally opposed symmetrical reflective surfaces. Each of the vertically and horizontally opposed symmetrical reflective surfaces includes a concave region positioned proximate a light source, and a convex region positioned distal the light source. The pairs of vertically opposed symmetrical reflective surfaces and horizontally opposed symmetrical reflective surfaces of the reflector redistribute light emitted from the light source such that the illumination device outputs a field of illumination having a substantially uniform intensity of light.

19 Claims, 11 Drawing Sheets

(56) References Cited

U.S. PATENT DOCUMENTS

| | | | |
|---|---|---|---|
| 4,403,275 A * | 9/1983 | Oser | F21V 7/005 |
| | | | 362/220 |
| 5,186,537 A * | 2/1993 | Katoh | F21V 7/005 |
| | | | 362/347 |
| 6,048,084 A * | 4/2000 | Sedovic | F21S 41/37 |
| | | | 362/347 |
| 6,543,921 B2 * | 4/2003 | Natsume | F21S 48/23 |
| | | | 362/296.07 |
| 6,578,983 B2 * | 6/2003 | Holten | F21V 7/005 |
| | | | 362/217.07 |
| 7,470,042 B2 | 12/2008 | Ayabe et al. | |
| 7,950,830 B2 * | 5/2011 | Kosters | G02B 5/10 |
| | | | 362/296.07 |
| 8,197,101 B2 | 6/2012 | Kokado et al. | |
| 8,646,948 B1 * | 2/2014 | Reo | F21V 7/24 |
| | | | 362/296.05 |
| 9,136,444 B2 | 9/2015 | Ulasyuk | |
| 9,182,098 B2 | 11/2015 | Caldwell et al. | |
| 9,442,285 B2 | 9/2016 | Rogers | |
| 9,476,548 B2 | 10/2016 | Peck et al. | |
| 9,523,480 B2 * | 12/2016 | Smith | F21V 5/04 |
| 9,729,853 B2 | 8/2017 | Billerbeck et al. | |
| 2002/0141182 A1 | 10/2002 | Holten | |
| 2007/0279908 A1 | 12/2007 | Alcelik | |
| 2010/0027274 A1 * | 2/2010 | Liu | F21V 7/05 |
| | | | 362/346 |
| 2015/0055348 A1 * | 2/2015 | Ha | F21K 9/23 |
| | | | 362/296.01 |
| 2016/0381264 A1 | 12/2016 | Qian et al. | |
| 2018/0275489 A1 * | 9/2018 | Hung | G03B 15/05 |

\* cited by examiner

ILLUMINATION DEVICE HAVING REFLECTOR WITH CONCAVE AND CONVEX SYMMETRICAL SURFACES

CROSS REFERENCE TO RELATED APPLICATIONS

This application claims priority to U.S. Provisional Patent Application Ser. No. 62/887,540, filed Aug. 15, 2019, the entirety of which is hereby incorporated herein by reference for all purposes.

BACKGROUND

Light reflectors may be used to redirect light emitted from a light source towards a scene. However, typical light reflectors, such as spherical reflectors, parabolic reflectors, pyramid reflectors, or compound parabolic concentrators, do not provide a substantially uniform field of illumination across a range of depths in an illuminated scene. The non-uniform fields of illumination of these light sources and reflectors may cause errors to occur in computer vision tasks such as object recognition.

SUMMARY

An illumination device is provided. The illumination device may comprise a light source configured to emit high angle light, moderate angle light, and direct angle light. The high angle light may be emitted from the light source at a larger angle than the moderate angle light, and the moderate angle light may be emitted from the light source at a larger angle than the direct angle light. The illumination device may further comprise a reflector having a pair of vertically opposed symmetrical reflective surfaces and a pair of horizontally opposed symmetrical reflective surfaces. Each of the vertically and horizontally opposed symmetrical reflective surfaces may be formed according to a local surface slope and redirection relationship so as to have a first region that is concave, and a second region that is convex. For each of the vertically and horizontally opposed symmetrical reflective surfaces, the first region may be formed proximate to a mounting location of the light source, the first region being positioned to reflect high angle light emitted from the light source. The second region may be formed on a distal side of the first region relative to the mounting location of the light source, the second region being positioned to reflect moderate angle light emitted from the light source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1B:
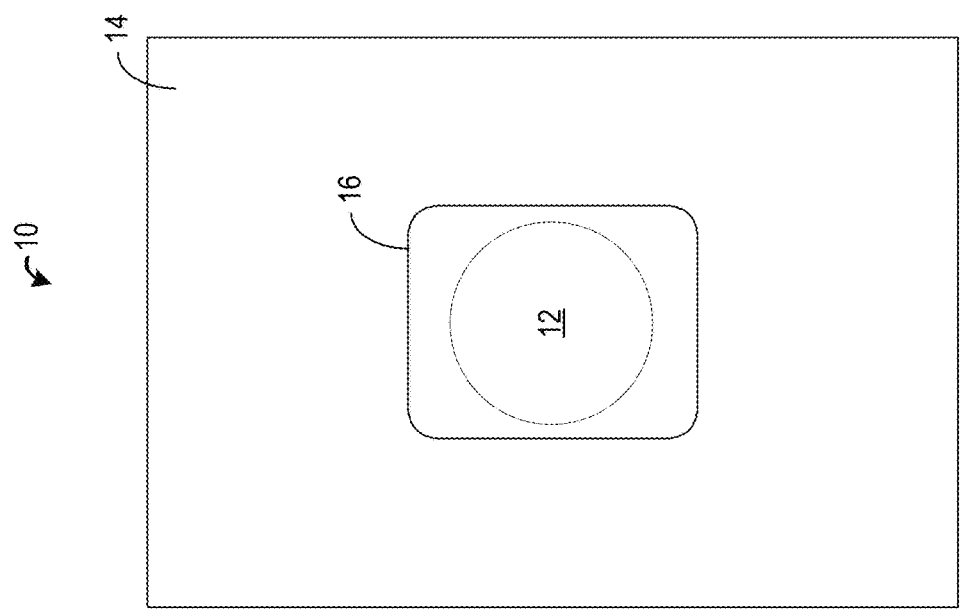
FIG. 1B shows a bottom up view of the example illumination device of FIG. 1A.
Figure 1B:
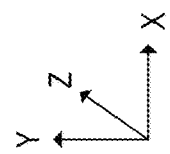

Computer vision tasks such as face detection and recognition may potentially require substantially uniform light to be illuminated in a working range of 0.30 meters to 5 meters. Additionally, wide-angle high-resolution infrared (IR) camera images intended for machine vision input may require high uniformity in illumination intensity across a field of illumination (FOI) in order to cover/support the field of view (FOV) of the camera, which may potentially have a horizontal FOV greater than 130 degrees. Typical light source and reflector systems may potentially be unable to provide a substantially uniform light intensity across the full field of view of such a camera. Further, less-visible higher wavelength IR light such as, 940 nm light emitted from a light emitting diode (LED) light source, typically requires more than 2.5 times the light energy to achieve a similar signal-to-noise ratio as 850 nm light, due to image sensor quantum efficiency (QE) roll-off. Additionally, typical reflector systems redistribute light emitted from a light source into a field of illumination (FOI) that does not closely match the FOV of the camera. For example, spherical reflector systems may redistribute light into a circular cone, which may not match a more rectangular FOV of a camera. Further, LED sources equipped with a dome lens typically emit rotationally or circularly symmetric output profiles which have intensity roll-off with increased emission angle from peak output at angle normal to source.

To address these issues, FIG. 1 illustrates a front view of an illumination device 10 that includes a light source 12 and a reflector 14. The reflector is shaped to efficiently redistribute light emitted from the light source 12 into a FOI that closely matches the FOV of a camera, thus potentially reducing wasted light and energy consumption of the illumination device 10 compared to typical reflector systems. The reflector 14 may include an open area 16 through which portions of the light source 12 may be inserted. The light source 12 may be mounted at a position proximate to the open area 16 such that light from the light source 12 may be emitted within a space of the reflector 14. FIG. 1B illustrates a back view of the illumination device 10. As shown, portions of the light source 12 may be inserted through the open space 16 of the reflector 14. In one example, the open space 16 may further include mounting structures, and the light source 12 may be attached to the mounting structures of the reflector 14. In another example, both the light source 12 and the reflector 14 may be mounted to a planar support structure. In one example, the light source 12 may take the form of an LED light source configured to emit infrared light. In one example, the light source 12 may be a 940 nm infrared LED that emits a spectral bandwidth including light output power (optical power) in the 900-1000 nm range and typically approximately 50 nm full width at half maximum (FWHM) and center wavelength near 940 nm. In another example, the light source 12 may be an 850 nm infrared LED that emits a spectral bandwidth including light output power in the 810 nm to 890 nm range and typically approximately 40 nm FWHM and a center wavelength near 850 nm. However, it should be appreciated that the light source 12 may emit other wavelengths of light, such as, between 800 nm to 1000 nm, light within the visible light spectrum such as 380 nm to 750 nm, or another suitable wavelength.

In one example, the reflector 14 may be made of metal, such as, for example, copper, aluminum, etc., that is machined and polished, and may further include a protective cover layer to inhibit oxidation of the reflective surface (e.g. protected copper, protected aluminum). As another example, the reflector 14 may be injection molded in plastic and reflective surfaces coated on the plastic with appropriate reflective coating, such as, for example, aluminum, enhanced aluminum, protected aluminum, silver, protected silver, dichroic coating, or any other suitable optical thin film coating to achieve high reflectivity of the wavelengths emitted from light source 12. Further still, an underside of the reflector 14 may be further formed to include voids such as structural webbing to minimize weight or volume of material required to mold the reflector 14, while maintaining the structural integrity of the optically reflective surface profile.

Figure 1A:
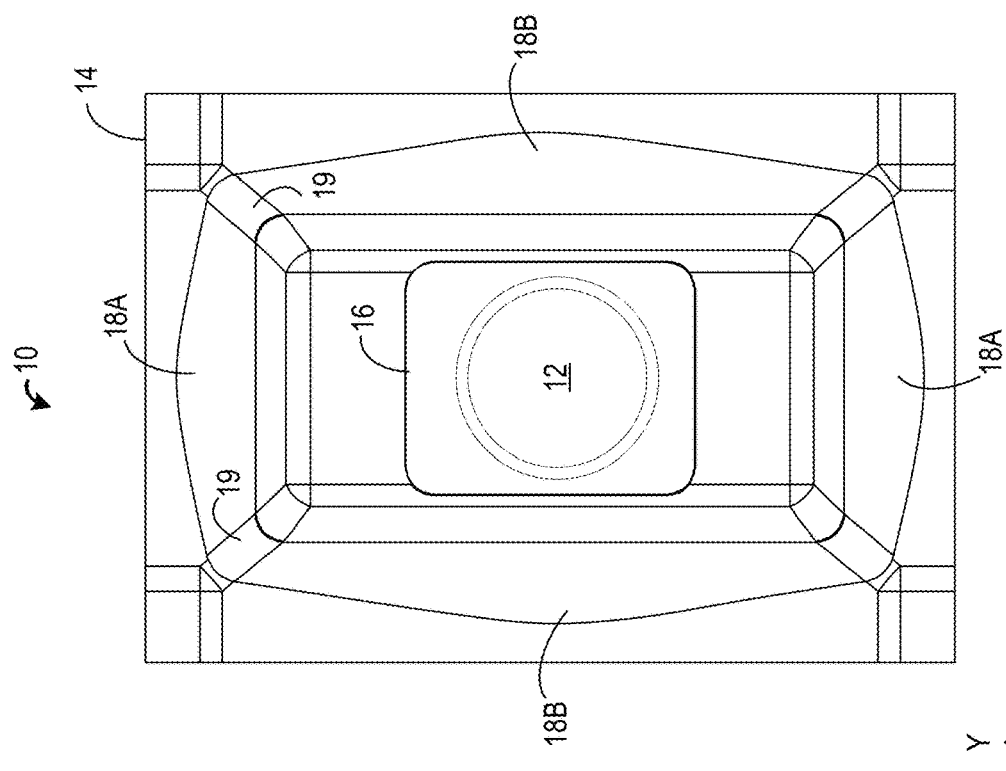
FIG. 1A shows a top down view of an example illumination device that includes a reflector of the present disclosure.
Figure 1A:
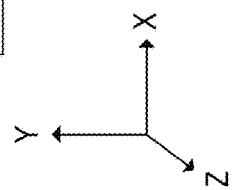

As illustrated in FIG. 1A, the reflector may include a pair of vertically opposed symmetrical reflective surfaces 18A and a pair of horizontally opposed symmetrical reflective surfaces 18B. In this example, the y-axis extends vertically, the x-axis extends horizontally, and the z-axis extends depth-wise into a scene being illuminated by the illumination device 10. As described herein, the term "horizontally opposed" refers to two surfaces that oppose and face each other along a horizontal dimension. Similarly, the term "vertically opposed" refers to two surfaces that oppose and face each other along a vertical dimension. Thus, in this coordinate system, the pair of vertically opposed symmetrical reflective surfaces 18A extend horizontally along the x-axis and are vertically opposed to each other along a vertical dimension parallel to the y-axis, and the pair of horizontally opposed symmetrical reflective surfaces 18B extend vertically along the y-axis and are horizontally opposed to each other along a horizontal dimension parallel to the x-axis.

The pair of reflective surfaces 18A are symmetrical to each other and are positioned to face each other in an opposing arrangement. Similarly, the pair of reflective surfaces 18B are symmetrical to each other and are positioned to face each other in an opposing arrangement. In one example, each of the vertically and horizontally opposed symmetrical reflective surfaces 18A and 18B are formed according to a local surface slope and redirection relationship, which will be described in more detail below. Each of the vertically and horizontally opposed symmetrical reflective surfaces 18A and 18B may be formed out of polished aluminum, or another type of reflective material, as described above. It should be appreciated that the lines illustrated in the middle of the vertically and horizontally opposed symmetrical reflective surfaces 18A and 18B are merely illustrative, and that the reflective surfaces may take the form of smooth curves. Further, in one example, the illustrated lines along and near the seams 19 between reflective faces of the reflective surfaces 18A and 18B may represent rounded corners which may be utilized to ease fabrication of the reflector 14 (e.g., machined and polished). In another example, these illustrated lines for the seams 19 may represent intersections between reflective faces of the reflective surfaces 18A and 18B that may be sharp in transition for fabrication of the reflector 14 using fabrication techniques such as, for example, injection molding.

Figure 2A:
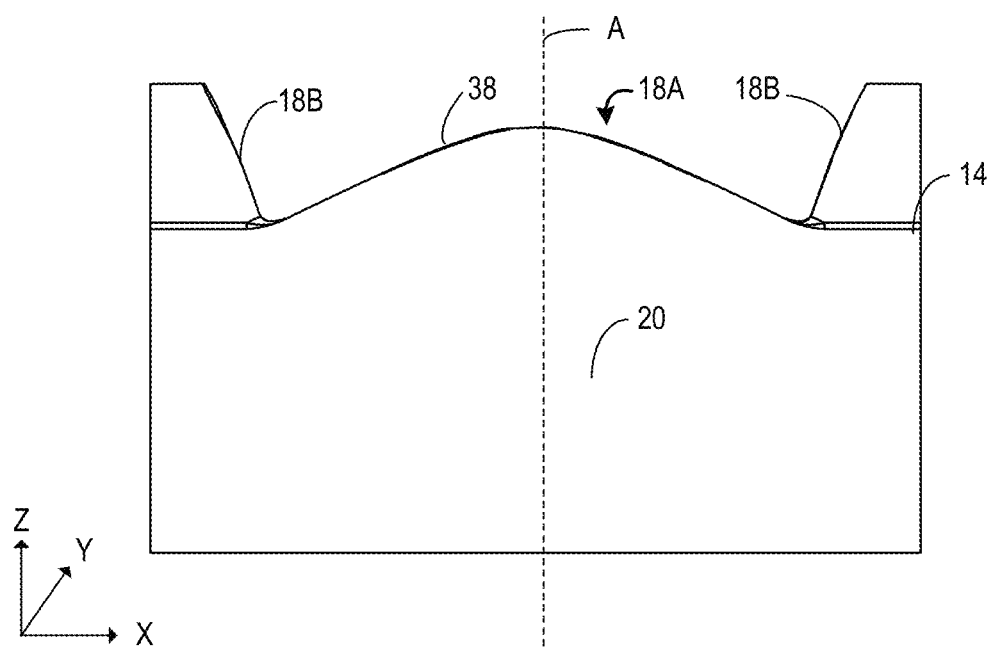
FIG. 2A shows a side view of the example illumination device of FIG. 1A.
Figure 2B:
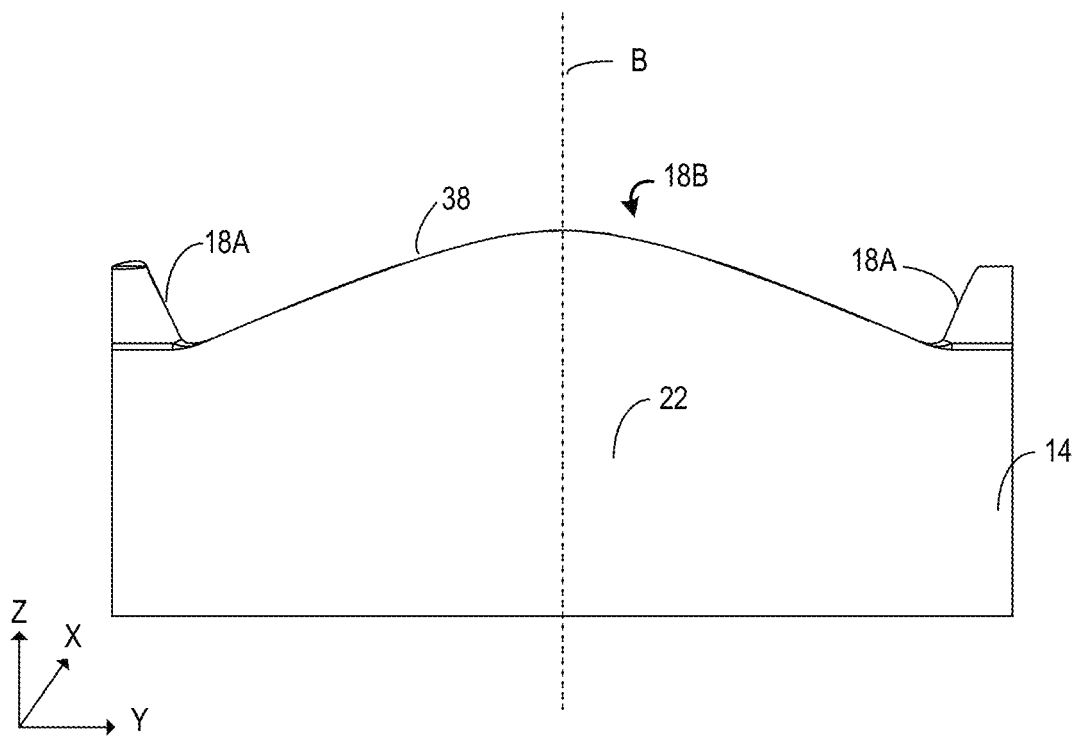
FIG. 2B shows another side view of the example illumination device of FIG. 1A.

FIG. 2A illustrates an outer view of the reflector 14 along the y-axis that shows a backside 20 of one of the vertically opposed symmetrical reflective surfaces 18A. FIG. 2A also illustrates an upper portion of the pair of horizontally opposed symmetrical reflective surfaces 18A, which are located on an inner portion of the reflector 14. FIG. 2B illustrates an outer view of the reflector 14 along the x-axis that shows a backside 22 of one of the horizontally opposed symmetrical reflective surfaces 18B. FIG. 2B also illustrates an upper portion of the pair of vertically opposed symmetrical reflective surfaces 18A, which are located on an inner portion of the reflector 14.

The backsides 20 and 22 of the vertically opposed symmetrical reflective surfaces 18A and horizontally opposed symmetrical reflective surfaces 18B are illustrated as flat walls such that the outer portion of the reflector 14 has a substantially rectangular shape. However, it should be appreciated that the outer surface of the reflector 14 may take other suitable shapes and forms that do not impact the shapes of the vertically and horizontally opposed symmetrical reflective surfaces 18A and 18B that form the inner surface of the reflector 14.

Figure 3:
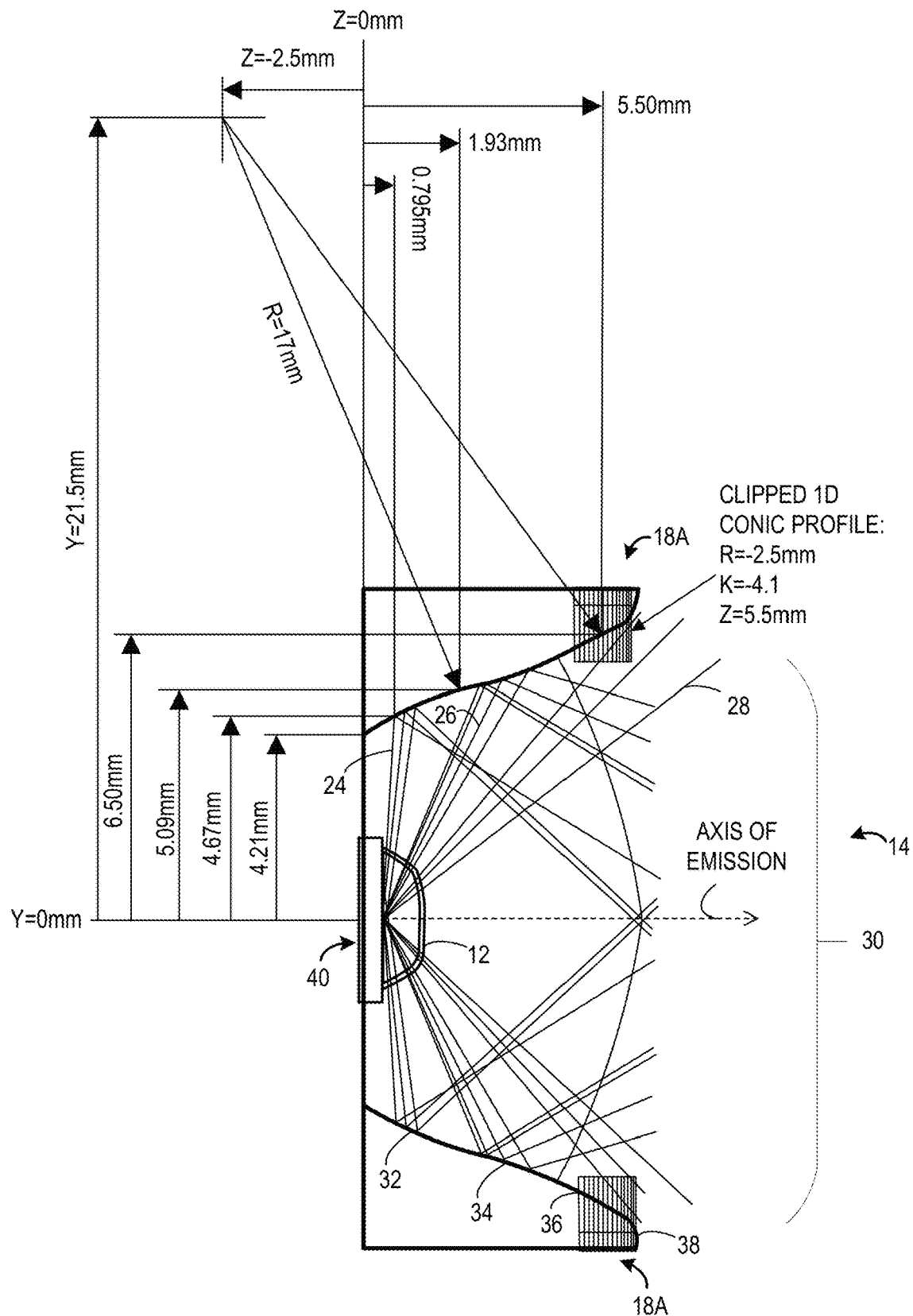
FIG. 3 shows a cross-section view of the example illumination device of FIG. 1A.

FIG. 3 shows a cross section of the reflector 14 along a cross-section A shown in FIG. 2A. As illustrated, the light source 12 may be configured to emit light across a range of angles including high angle light 24, moderate angle light 26, and direct angle light 28. In this example, the high angle light 26 is emitted from the light source 12 at a larger angle than the moderate angle light 28. Additionally, the moderate angle light 26 is emitted from the light source 12 at a larger angle than the direct angle light 18. In one example, the high angle light 24 may include light emitted within a range of +/−70 to 90 degrees of the primary axis of emission of the light source 12. Moderate angle light 26 may include light emitted within a range of +/−70 to 50 degrees of the primary axis of emission of the light source 12. Direct angle light 28 may include light emitted within a range of +/−50 to 0 degrees of the primary axis of emission of the light source 12. It should be appreciated that these ranges are exemplary, and that the high angle light 24, moderate angle light 26, and direct angle light 28 may be defined both other sets of ranges. For example, the high angle light 24 may include light emitted within a range of +/−75 to 90 degrees of the primary axis of emission of the light source 12, moderate angle light 26 may include light emitted within a range of +/−75 to 45 degrees of the primary axis of emission of the light source 12, and direct angle light 28 may include light emitted within a range of +/−45 to 0 degrees of the primary axis of emission of the light source 12.

The light emitted from the light source 12 may, for example, include infrared light in the 850 nm to 940 nm range. However, it should be appreciated that the light source 12 may emit light in other wavelengths, such as, for example, light in the visible light spectrum. As illustrated in FIG. 3, the reflector 14 may be configured to redistribute light emitted from the light source 12 into a field of illumination 30.

As illustrated in FIG. 3, the vertically opposed symmetrical reflective surfaces 18A are formed according to a local surface slope and redirection relationship such that each have a first region 32 that is concave, a second region 34 that is convex, and a third region 36 that terminates in a rim 38. The first region 32 is formed proximate to a mounting location 40 of the light source 12, which is at the open area 16 of the reflector 14 shown in FIGS. 1A and 1B. Due to being positioned proximate to the mounting location 40 of the light source 12, the first region 32 is positioned to reflect high angle light 24 emitted from the light source 12. Typically, the high angle light 24 emitted from the light source 12 will have a lower light intensity than the moderate angle light 26 and direct angle light 38. After being reflected by the concave shape of the first region 32, the high angle light 24 is uniformly redistributed across the field of illumination 30, by combining the redirected and redistributed light from both opposing regions, each of which may contribute an opposing roll-off in intensity to contribute toward uniformity across FOI 30. The higher angle light of the high angle light 24 emitted from the light source 12 contributes toward low angle light within FOI 30 and the lower angle light of the high angle light 24 emitted from the light source 12 contributes toward high angle light within FOI 30.

As illustrated in FIG. 3, the second region 34 is formed on a distal side of the first region 32 relative to the mounting location 40 of the light source 12. That is, the second region is a portion of the vertically opposed symmetrical reflective surfaces 18A that is farther away from the mounting location 40 of the light source 12 than the first region. In this arrangement, the second region 34 is positioned to reflect moderate angle light 26 emitted from the light source 12. After being reflected by the convex shape of the second region 34, the moderate angle light 26 emitted from the light source 12 is diverged and uniformly redistributed across the field of illumination 30, by combining the redirected and redistributed light from both opposing regions, each of which may contribute an opposing roll-off in intensity to contribute toward uniformity across FOI 30. The portions of moderate angle light 26 nearest the light source 12 contributes toward high angle light within FOI 30 and the portions of the moderate angle light 26 farther from the light source 12 and having less moderate angle contributes toward low angle light within FOI. Thus, the combination of first region 32 and the second region 34 reflect and redistribute both the high angle light 24 and the moderate angle light 26 uniformly across the field of illumination 30, by combining the redirected and redistributed light from both first and second regions of both vertically opposed symmetrical reflective surfaces 18A, each surface of which may contribute an opposing roll-off in intensity across FOI 30 such that the sum provides substantially uniform redistribution of the light reflected from both vertically opposed symmetrical reflective surfaces 18A. Typically, the direct angle light 28 emitted from the light source 12 has a substantially uniformity light intensity. Thus, the combination of the reflected high angle light 24 and moderate angle light 26, and the direct angle light 28 provide a substantially uniform light intensity across the FOI 30. As used herein, the light intensity of the FOI of the illumination device 10 is "substantially uniform" by providing sufficient uniformity across the FOI covering the FOV of a camera device such that images captured of a scene illuminated by the illumination device 10 may be accurately processed for computer vision tasks such as object recognition. An FOI that is not "substantially uniform" may cause errors to occur in computer vision tasks, such as, for example, an object recognition process may erroneously identify a change in light intensity in the non-uniform FOI as being caused by an object in the scene, and thus inaccurately identify objects and boundaries in the scene.

FIG. 3 shows several example y and z values for several positions on one of the vertically opposed symmetrical reflective surfaces 18A according to one example local surface slope and redirection relationship. The shape of the vertically opposed symmetrical reflective surfaces 18A may be determined by optimizing the local slope of the reflective profile and redirecting the angular sweep of light source 12 rays within each region of angles (e.g., high angle, moderate angle, and direct angle light) into and within the target FOI such that the overlapping combined illumination from each region of angles forms an acceptable level of uniformity across the FOI 30. It should be appreciated that these values illustrated in FIG. 3 are exemplary, and that the reflector 14 may have other suitable dimensions.

As illustrated in FIG. 3, the third region 36 may continue the convex shape of the second region 34 until terminating in the rim 38. As illustrated, the rim 38 is formed on a distal side of the second region 34 relative to the mounting location 40 of the light source 12. Side views of the rims 38 of the vertically and horizontally opposed symmetrical reflective surfaces 18A and 18B are illustrated in FIGS. 2A and 2B. In one example, a biconic surface may be used to form a ~1D lateral-extruded shaped-profile cut of the end tip for the rim 38 of each of the vertically and horizontally opposed symmetrical surfaces 18A and 18B. The biconic surface may be defined by the sag equation:

$$z = \frac{c_x x^2 + c_y y^2}{1 + \sqrt{1 - (1+k_x)c_x^2 x^2 - (1+k_y)c_y^2 y^2}}, \text{ where } c_x = \frac{1}{R_x}, c_y = \frac{1}{R_y}.$$

FIG. 3 illustrates a wire mesh that indicates an orientation and location for a clipped one-dimensional conic surface profile which may be used to define an edge profile for the rims 38 of the vertically opposed symmetrical reflective surfaces 18A. For example, the vertically opposed symmetrical reflective surfaces 18A may be clipped beyond the conic surface profile intersection with the vertically opposed symmetrical reflective surfaces 18A. FIG. 3 also shows an example set of parameters R=-2.5 mm, conic constant k=-4.1, and z=5.5 mm, for the shape of the rims 38 of the vertically opposed symmetrical reflective surfaces 18A. It should be appreciated that these values are exemplary, and that other suitable values may be used to define the shape of the rims 38 of the vertically opposed symmetrical reflective surfaces 18A. The conic profile for the rims 38 approximates a surface that is formed by all lines-of-sight from a center of the light source 12 to the edges of a target solid angle shape of the FOI 30. That is, the shape of the rims 38 of the vertically and horizontally opposed symmetrical reflective surfaces 18A and 18B frames directly emitted light 28 from the light source 12 mounted within the reflector 14 into a substantially rectangular shape, such as, for example, a rectangular solid angle cone which substantially matches a FOV of a camera. However, it should be appreciated that the rims 38 may be formed according to other surface profiles to achieve other target solid angle shapes of the FOI 30.

Figure 4:
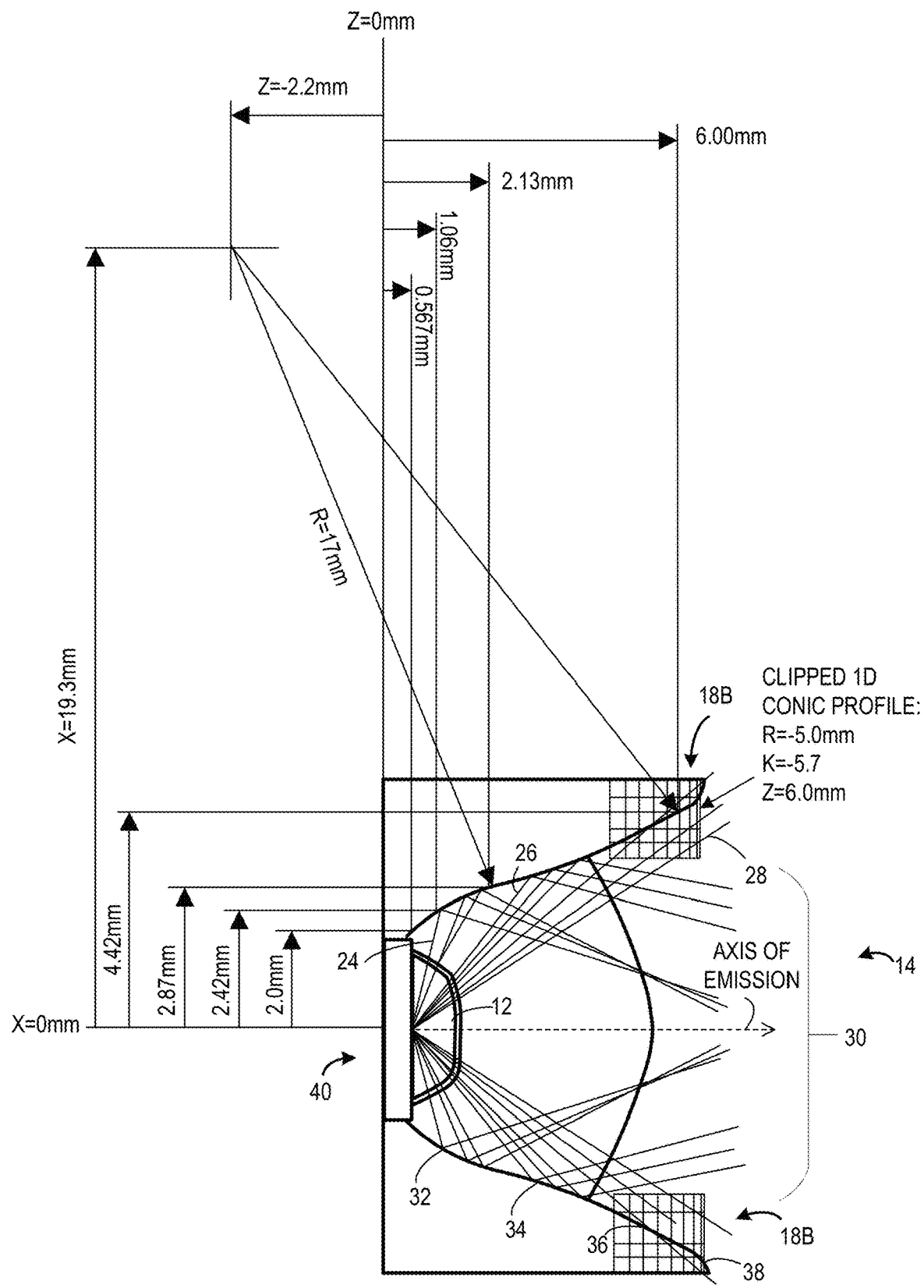
FIG. 4 shows another cross-section view of the example illumination device of FIG. 1A.

FIG. 4 shows a cross section of the reflector 14 along a cross-section B shown in FIG. 2B. FIG. 4 shows several example x and z values for several positions on one of the horizontally opposed symmetrical reflective surfaces 18B according to one example local surface slope and redirection relationship. The shape of the horizontally opposed symmetrical reflective surfaces 18B may be determined by optimizing the local slope of the reflective profile and redirecting the angular sweep of light source 12 rays within each region of angles (e.g., high angle, moderate angle, and direct angle light) into and within the target FOI such that the overlapping combined illumination from each region of angles forms an acceptable level of uniformity across the FOI 30. However, it should be appreciated that these values are exemplary, and that the reflector 14 may have other suitable dimensions.

Similarly to the vertically opposed symmetrical reflective surfaces 18A, the horizontally opposed symmetrical reflective surfaces 18B each have a first region 32 that is concave, a second region 34 that is convex, and a third region 36 that terminates in a rim 38. The first region 32 is formed proximate to the mounting location 40 of the light source 12, and is positioned to reflect high angle light 24 emitted from the light source 12. After being reflected by the concave shape of the first region 32, the high angle light 24 is uniformly redistributed across the field of illumination 30, by combining the redirected and redistributed light from both opposing regions, each of which may contribute an opposing roll-off in intensity to contribute toward uniformity across FOI 30. The higher angle light of the high angle light 24 emitted from the light source 12 contributes toward low angle light within FOI 30 and the lower angle light of the high angle light 24 emitted from the light source 12 contributes toward high angle light within FOI 30.

The second region 34 is formed on a distal side of the first region 32 relative to the mounting location 40 of the light source 12, and is positioned to reflect moderate angle light 26 emitted from the light source 12. After being reflected by the convex shape of the second region 34, the moderate angle light 26 emitted from the light source 12 is diverged and uniformly redistributed across the field of illumination 30, by combining the redirected and redistributed light from both opposing regions, each of which may contribute an opposing roll-off in intensity to contribute toward uniformity across FOI 30. The portions of moderate angle light 26 nearest the light source 12 contributes toward high angle light within FOI 30 and the portions of the moderate angle light 26 farther from the light source 12 and having less moderate angle contributes toward low angle light within FOI. Thus, the combination of first region 32 and the second region 34 reflect and redistribute both the high angle light 24 and the moderate angle light 26 uniformly across the field of illumination 30, by combining the redirected and redistributed light from both first and second regions of both horizontally opposed reflective surfaces 18B, each surface of which may contribute an opposing roll-off in intensity across FOI 30 such that the sum provides substantially uniform redistribution of the light reflected from both horizontally opposed symmetrical reflective surfaces 18B. In this manner, the combination of the first and second regions 32 and 34 of each of the vertically and horizontally opposed symmetrical reflective surfaces 18A and 18B redistribute the high angle and moderate angle light emitted from the light source 20 across the x and y dimensions of the field of illumination 30 in a uniform manner.

Additionally, as illustrated in FIG. 4, the third region 36 may continue the convex shape of the second region 34 until terminating in the rim 38 that is formed on a distal side of the second region 34 relative to the mounting location 40 of the light source 12. FIG. 4 illustrates a wire mesh that indicates an orientation and location for a clipped one-dimensional conic surface profile which may be used to define an edge profile for the rims 38 of the horizontally opposed symmetrical reflective surfaces 18B. For example, the horizontally opposed symmetrical reflective surfaces 18B may be clipped beyond the conic surface profile intersection with the horizontally opposed symmetrical reflective surfaces 18B. FIG. 4 also shows an example set of parameters R=−5.0 mm, conic constant k=−5.7, and z=6.0 mm, for the shape of the rims 38 of the horizontally opposed symmetrical reflective surfaces 18B. It should be appreciated that these values are exemplary, and that other suitable values may be used to define the shape of the rims 38 of the horizontally opposed symmetrical reflective surfaces 18B. As discussed above, the shape of the rims 38 of the vertically and horizontally opposed symmetrical reflective surfaces 18A and 18B frames directly emitted light 28 from the light source 12 mounted within the reflector 14 into a substantially rectangular shape, such as, for example, a rectangular solid angle cone which substantially matches a FOV of a camera.

Figure 5:
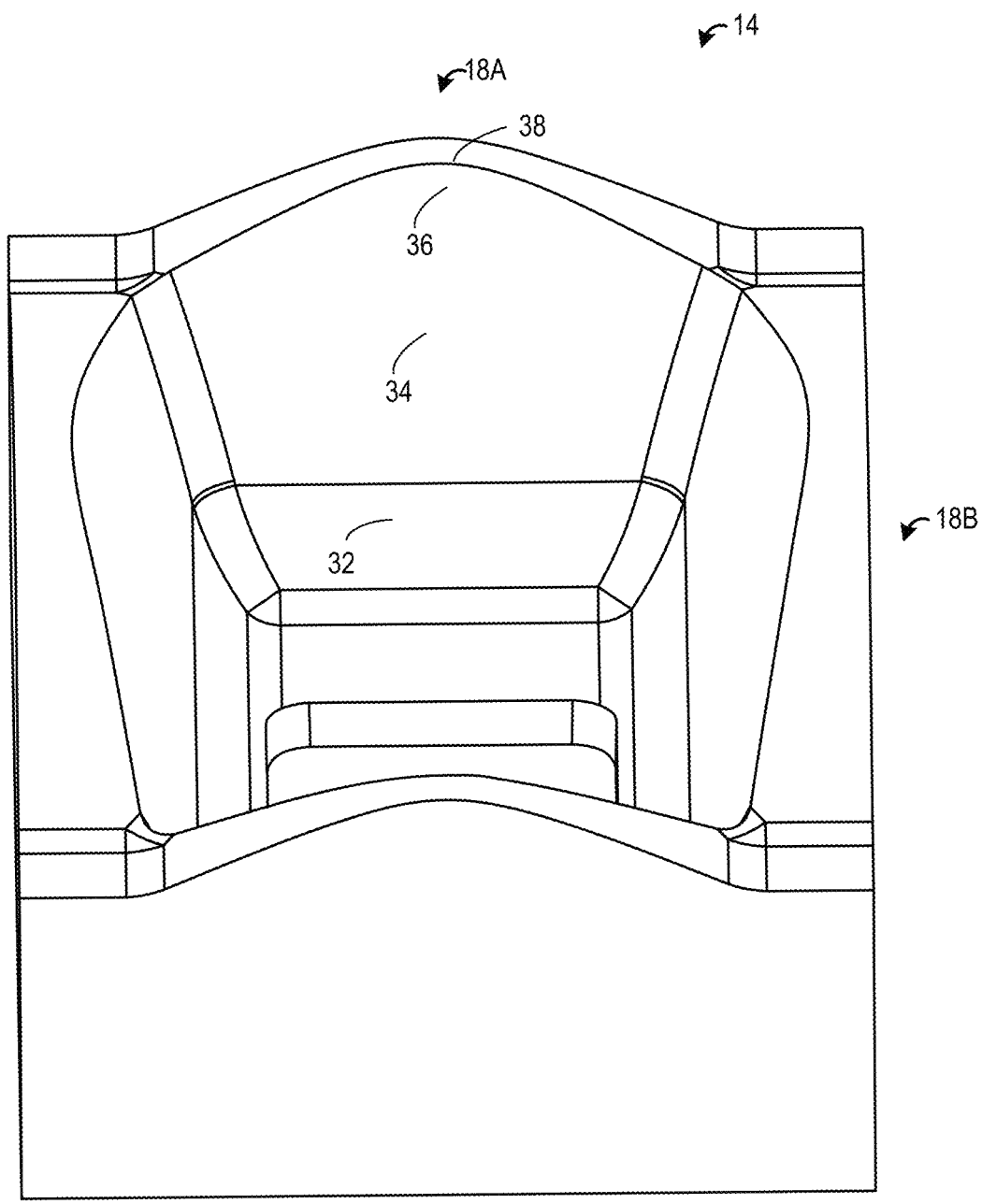
FIG. 5 shows an overhead view of the example illumination device of FIG. 1A.
Figure 5:
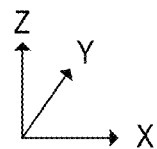

FIG. 5 shows another view of the reflector 14 that illustrates one of the vertically opposed symmetrical reflective surfaces 18A. As shown, the vertically opposed symmetrical reflective surface 18A includes a first region 32 having a concave shape, a second region 34 having a convex shape, and a third region 36 that terminates in a rim 38. It should be appreciated that the line separating the first 32 and second regions 34 is merely illustrative, and may represent an inflection point along the profile of the vertically and horizontally opposed symmetrical reflective surfaces 18A and 18B, and thus illustrates an inflection line from concave to convex regions. That is, the vertically opposed symmetrical reflective surface 18B may be smoothly curved between the first region 32 and second region 36. However, in one example, the vertically opposed symmetrical reflective surface 18A may be faceted to have the concave shape of the first region and the convex shape of the second region. In this example, the vertically opposed symmetrical reflective surface 18B may not be smoothly curved between the first region 32 and second region 34.

Figure 6:
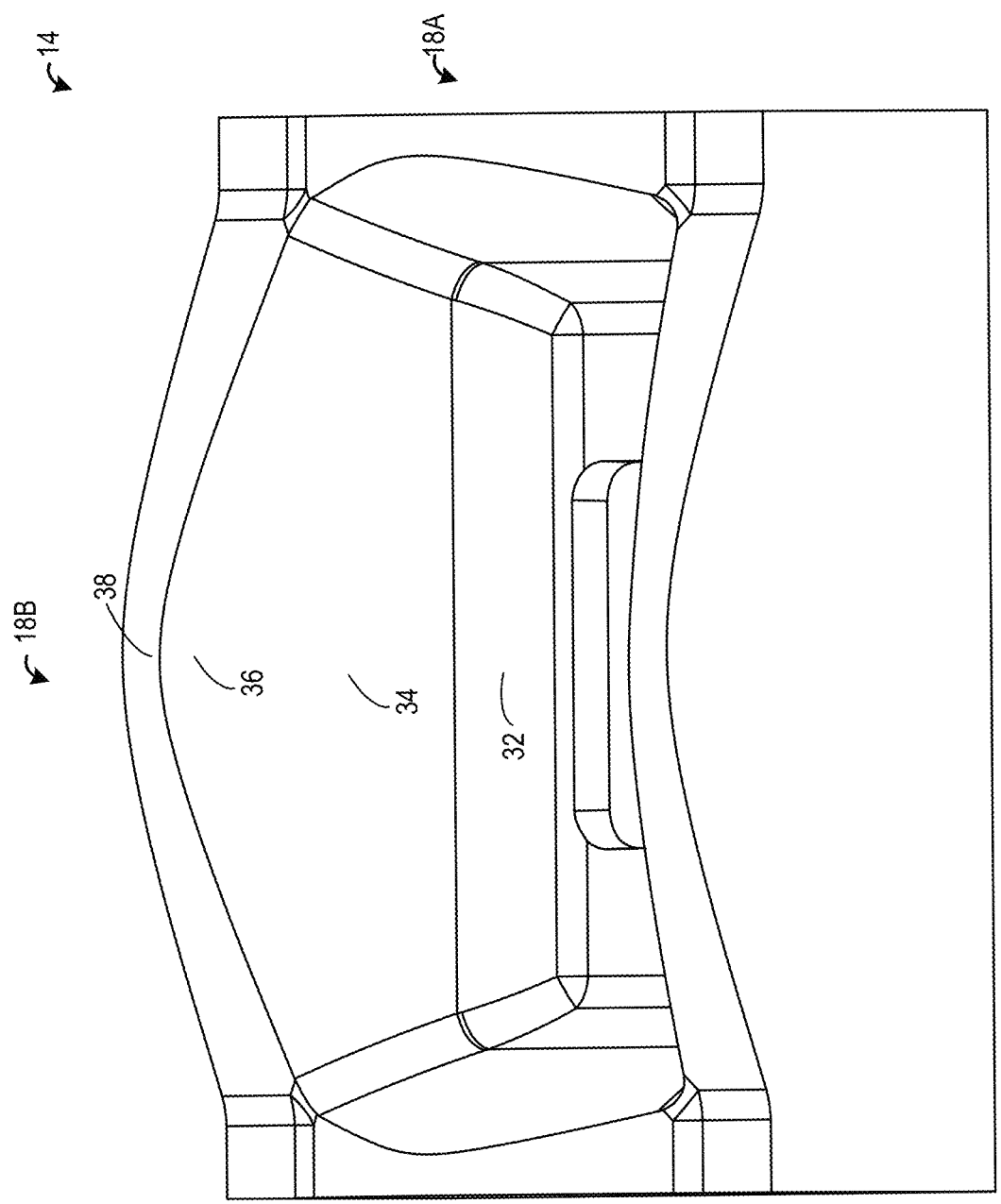
FIG. 6 shows another overhead view of the example illumination device of FIG. 1A.

FIG. 6 shows another view of the reflector 14 that illustrates one of the horizontally opposed symmetrical reflective surfaces 18B. Similarly to the vertically opposed symmetrical reflective surfaces 18A, the horizontally opposed symmetrical reflective surface 18B includes a first region 32 having a concave shape, a second region 34 having a convex shape, and a third region 36 that terminates in a rim 38.

Figure 7:
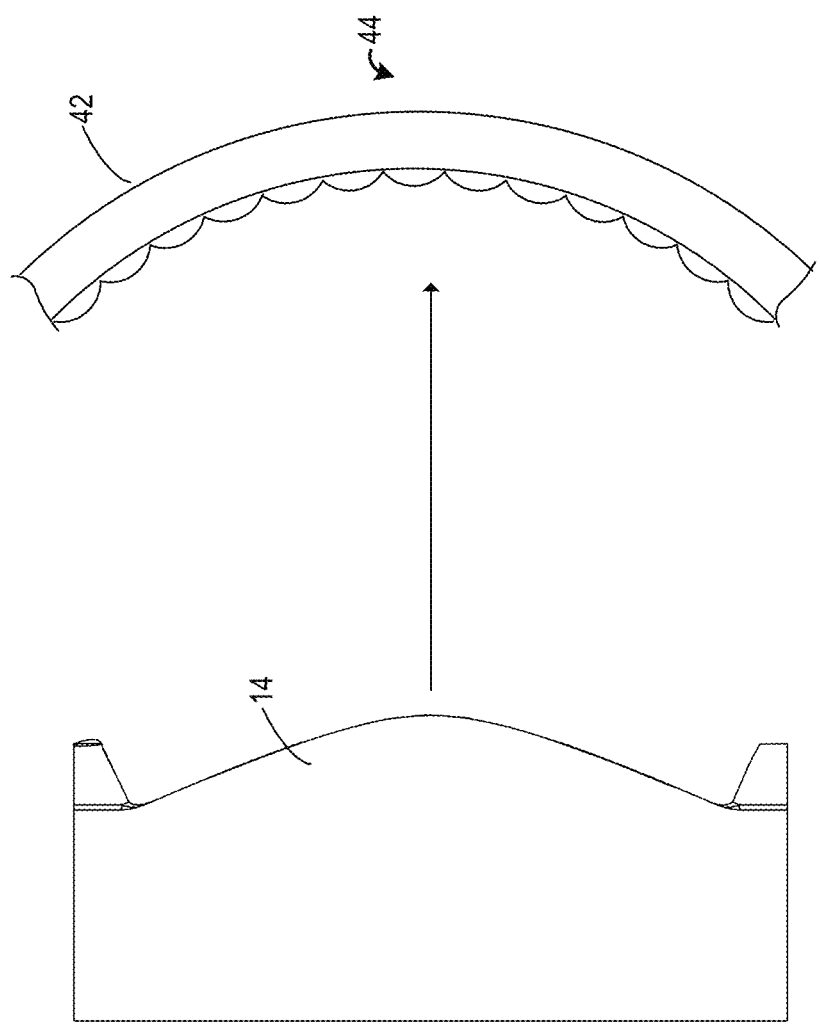
FIG. 7 shows an example optical diffuser and a side view of the example illumination device of FIG. 1A.

In one example, to provide further uniformity in light intensity of emitted light, the illumination device 10 may further include a lenticular optical diffuser 42. FIG. 7 illustrates an example lenticular optical diffuser 42. As shown, the lenticular optical diffuser may be located at a position 44 opposing the light source 12 and the reflector 14 such that light emitted from light source 12 and reflected by the reflector 14 passes through the lenticular optical diffuser 42. That is, the lenticular optical diffuser 42 may be mounted in front of the illumination device 10 such that light emitted by the light source 12 will pass through the lenticular optical diffuser 42. In one example, the lenticular optical diffuser 42 may be configured to have a full width at half maximum (FWHM) of between 20 degrees to 30 degrees. However, it should be appreciated that the lenticular optical diffuser 42 may be designed for other FWHM values. For example, the lenticular optical diffuser 42 may be configured to have a FWHM of between 20 degrees to 28 degrees, more preferably a FWHM of 24 degrees. The lenticular optical diffuser 42 may be used to soften uniformity artifact that may potentially occur due to fabrication defects or small misalignments between the position of the light source 12 and the position of the reflector 14. As such, there may be potential tradeoffs between diffuser strength and homogenization of defects, as well as diffuser strength and the portion of light that may potentially be directed outside of the target FOV. Moderate spread angle diffusers having substantial spread angle in one dimension, such as, for example, substantially horizontal diffusers, may potentially achieve sufficient homogenization while also sufficiently limiting light scatter outside the target FOV. Thus, in one example, the lenticular optical diffuser 42 may take the form of a 1D microlens array (MLA) (e.g., lenticular microlens array diffuser), or alternatively a diffuser that is nearly 1D in scatter profile, such as, for example, an oval diffuser output. Further, it should be appreciated that while a 2D scattering diffuser may be used as the lenticular optical diffuser 42, a substantially 1D scattering diffuser may potentially reduce the amount of light scattered outside the target FOV compared to the 2D scattering diffuser. However, 1D or 2D diffusers having gaussian output profiles may potentially not redistribute the light as effectively within the target FOV, compared to a 1D lenticular diffuser. Further, a 1D lenticular diffuser having pitch along the horizontal dimension, and substantially no variation along the vertical dimension, may potentially reduce backscatter caused by total internal reflection. It should be appreciated that an example lenticular optical diffuser 42 may include a constant pitch in the range of 55 µm to 400 µm. As a few additional non-limiting examples, the lenticular optical diffuser 42 may include an aperiodic, or chirped, lenticular spacing with limited variation in pitch along the arc of the array. Thus, it should be appreciated that the lenticular optical diffuser 42 may take any of the forms described above to achieve a suitable tradeoff between diffuser strength and homogenization of defects, as well as diffuser strength and the portion of light that may potentially be directed outside of the target FOV. Further, it should be appreciated that the lenticular optical diffuser 42 may take other suitable forms not specifically described herein.

Figure 8:
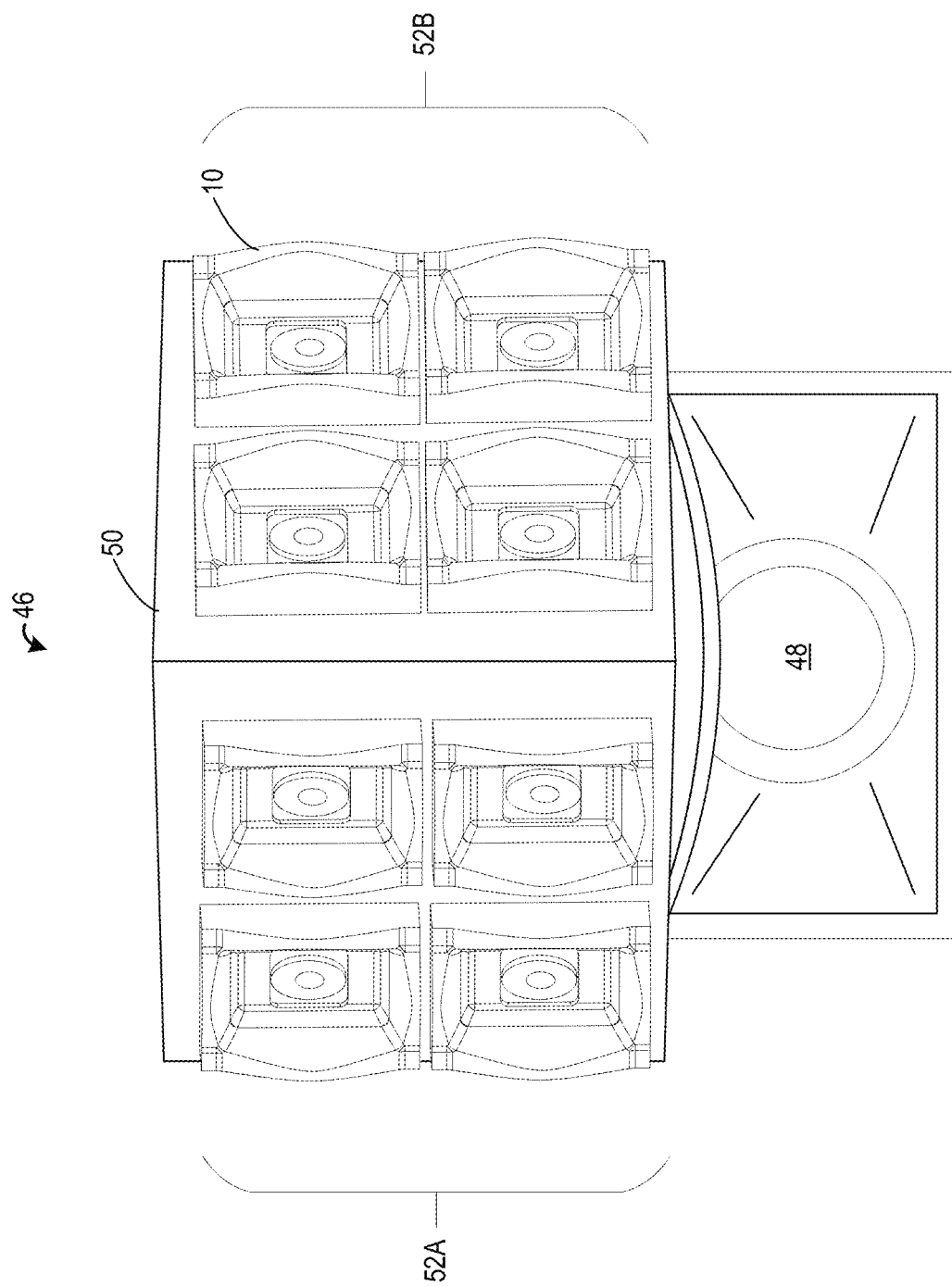
FIG. 8 shows a front view of an example camera system that includes one or more of the illumination devices of FIG. 1A.

The illumination device 10 described above may be incorporated into a camera system 46. FIG. 8 illustrates an example camera system 46 that includes a camera device 48 and at least one illumination device 10. The camera system 46 may include a planar support structure 50 that includes mounting structures configured to mount the at least one illumination device 10. The planar support structure 50 may further provide support structure for power cords/wires for the light source 12 of the at least one illumination device 10. In the illustrated example, the at least one illumination device 10 is mounted on top of the camera device 48. However, it should be appreciated that the camera system 46 may take other suitable configurations, such as, for example, the at least one illumination device 10 being mounted on a bottom or side of the camera device 48.

In these examples, the at least one illumination device 10 is arranged to emit a substantially uniform field of illumination 30 that covers a field of view of the camera device 48. Specifically, the at least one illumination device 10 may be configured to emit a field of illumination 30 that has shape of a substantially rectangular solid angle cone that covers the field of view of the camera device 48. Additionally, in one example, the reflector 14 of the at least one illumination device 10 redistributes light emitted from the light source 12 such that the illumination device 10 outputs a field of illumination 30 having a substantially uniform intensity of light between a distance of 0.3 m and 5.0 m from the illumination device 10. Having such a field of illumination 30, the camera system 46 may be used for computer vision tasks such as face detection and recognition that may potentially require substantially uniform light in a working range of 0.30 meters to 5 meters.

In the example illustrated in FIG. 8, the camera system 46 includes at least two sets 52 of illumination devices 10. In one example, each set 52 of illumination devices 10 includes at least four illumination devices 10. Each set of at least four illumination device 10 may be arranged in a grid along a plane, as illustrated in FIG. 8. For example, four illumination device 10 may be arranged in a 2×2 grid along the planar support structure 50 of the camera system 46. However, it should be appreciated that each set 52 of at least four illumination devices 10 may be arranged in other patterns, such as, for example, a line, a triangle, etc. Additionally, it should be appreciated that while FIG. 8 shows an example that includes two sets 52 of at least four illumination devices 10, that the camera system 46 may include any suitable number of sets 52 of illumination devices, such as, for example, three sets, four sets, etc.

Figure 9:
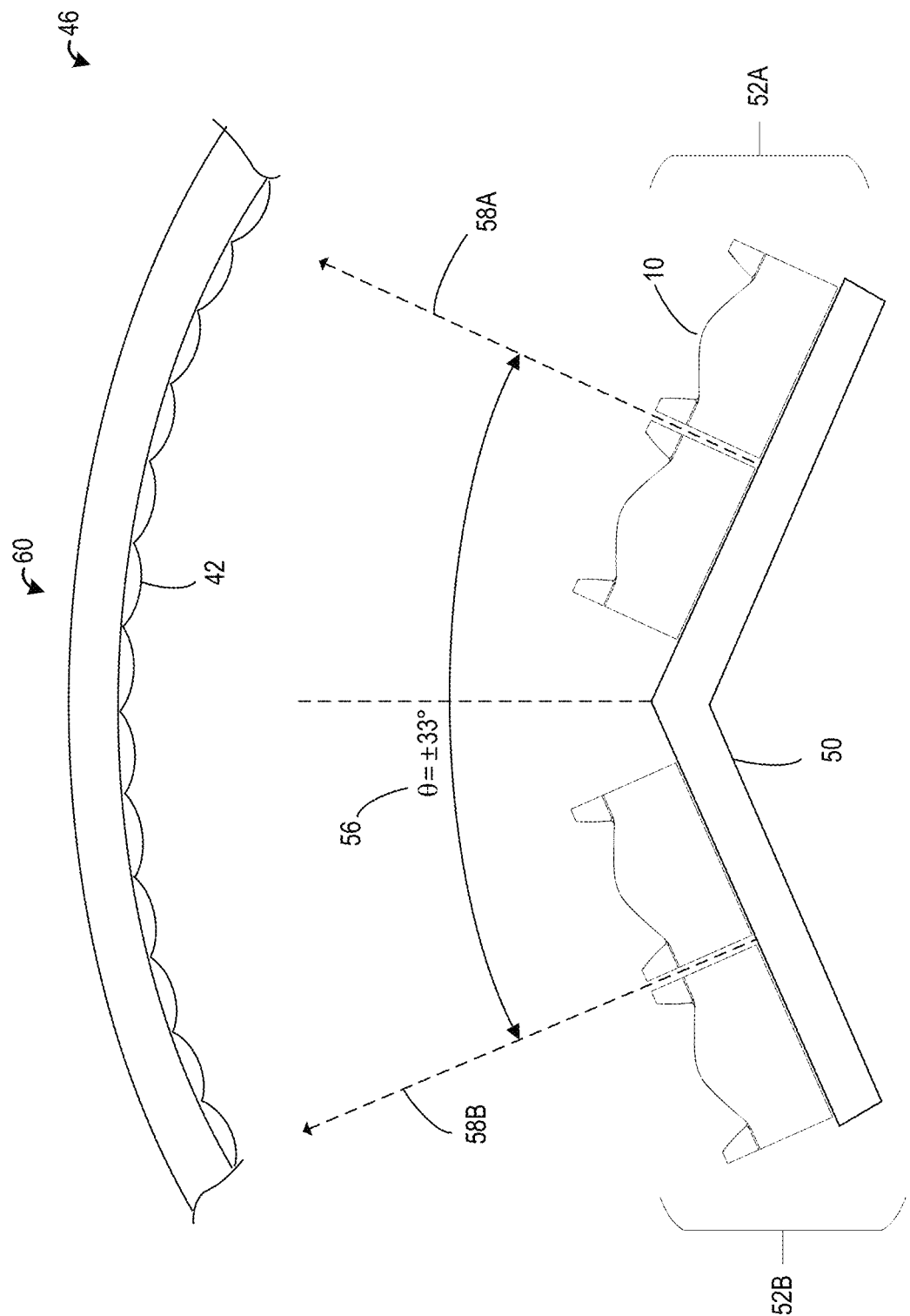
FIG. 9 shows a top down view of the example camera system of FIG. 8.

In one example, the light sources 12 of each of the illumination devices 10 may be configured to emit 940 nm light. In this example, each set of illumination devices 10 of the camera system 46 may include four illumination devices 10. In another example, the light sources 12 of each of the illumination devices 10 may be configured to emit 850 nm light. In this example, each set of illumination devices 10 of the camera system 46 may include one illumination device 10 per camera FOV, due to increased quantum efficiency of the image sensor for 850 nm light compared to 940 nm light. Thus, it should be appreciated that the particular number of illumination devices 10 included in each set of illumination devices may be set based on the optical power required in the object scene in order to support signal to noise (SNR) requirements of the captured image frames, for a given wavelength-dependent image sensor QE and optical power of light emitted by the light source 12 to achieve an irradiance at an object distance or a radiant intensity of the FOI that is suitable for that wavelength of light. FIG. 9 illustrates a top-down view of the camera system 46 of FIG. 8. As shown, the two sets 52A and 52B of at least four illumination devices 10 are arranged such that a separation angle 56 between a first direction of illumination 58A of a first set 52A of illumination devices 10 and a second direction of illumination 58B of a second set 52B of illumination devices 10 is between 32 degrees to 34 degrees. The separation angle 56 provides enough separation between the fields of illumination 30 of the first set 52A of illumination devices 10 and the second set 52B of illumination device 10 to prevent an increase in intensity of light due to overlapping fields of illumination 30. A separation angle 56 between 32 degrees and 34 degrees, such as, for example, 33 degrees, causes the combined field of illumination 30 of both the first set 52A and second set 52B of illumination devices 10 to have a substantially uniform light intensity. In the example where the light sources 12 are configured to emit 850 nm light, each of the two sets 51A and 52B of illumination devices 10 may include one illumination device 10 that arranged to have the separation angle 56. It should be appreciated that the particular number of illumination devices 10 included in each set of illumination devices may be selected based on the wavelength of light emitted by the light source 12.

In the example illustrated in FIG. 9, to further improve the uniformity in the light intensity of the field of illumination, the camera system 46 may further include an optical filter 60 that is arranged at a position in front of the camera device 48 and the at least one illumination device 10. In one example, the light source 12 of the illumination devices 10 may be configured to emit infrared light, and the optical filter 60 may be configured to permit (e.g., transmit) infrared light and to filter out (e.g., absorb or reject) visible light. In another example, the light source 12 may be configured to emit visible light, and the optical filter 60 may be configured to permit visible light and to filter out infrared light. It should be appreciated that other light source and optical filter configurations may be implemented by the camera system 46. As illustrated in FIG. 9, a portion of the optical filter 60 that is in front of the at least one illumination device 10 may include a lenticular optical diffuser 42. For example, the lenticular optical diffuser may be arranged on an inside surface of the optical diffuser 60 facing the illumination devices 10. In this example, a portion of the optical filter 60 that is in front of the camera device 48 does not include the lenticular optical diffuser.

Figure 10A:
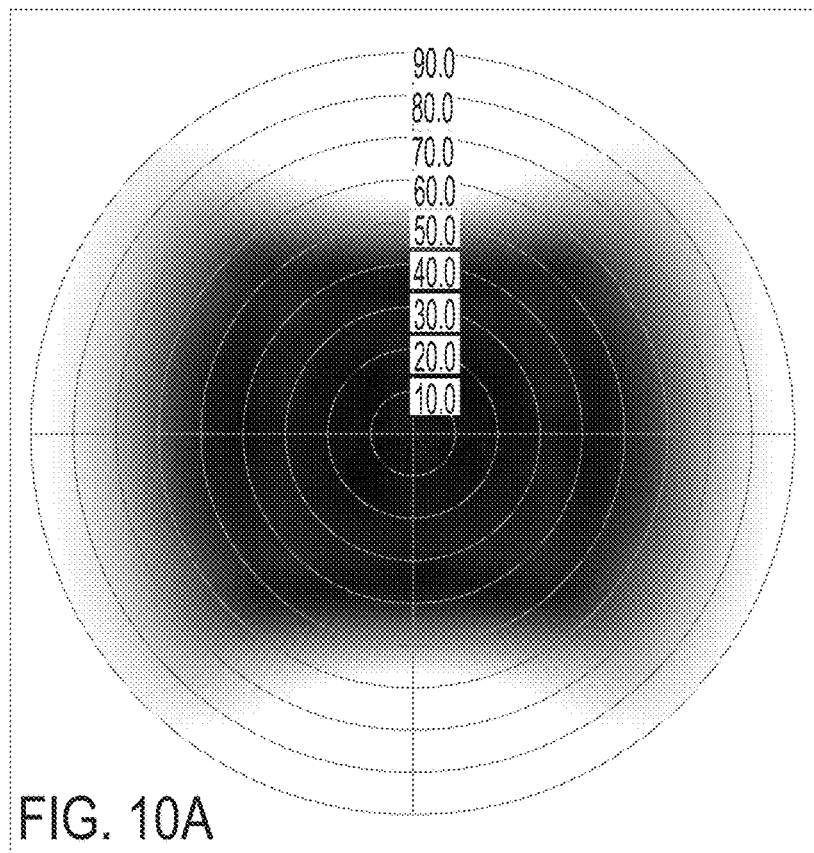
FIG. 10A shows an example polar (on-axis) radiant intensity image of a field of illumination emitted by the camera system of FIG. 8.
Figure 10B:
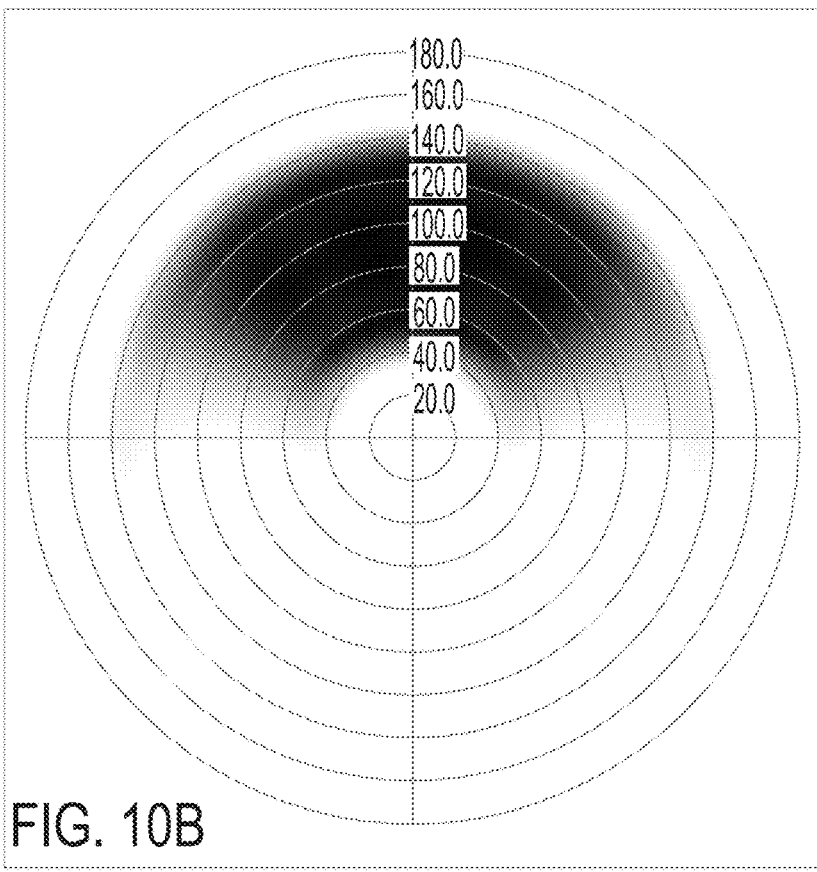
FIG. 10B shows an example polar (equator) radiant intensity image of a field of illumination emitted by the camera system of FIG. 8.

FIGS. 10A and 10B show example radiant intensity images of the field of illumination 30 emitted by the illumination devices 10 of the camera system 46. FIG. 10A shows an example polar (on-axis) radiant intensity image of the field of illumination 30 and FIG. 10B shows an example polar (equator or 360 plot) radiant intensity image of the field of illumination 30. As illustrated in FIGS. 10A and 10B, the field of illumination 30 has a substantially rectangular solid angle cone shape. The values of radiant intensity (in units of Watts per steradian, W/sr) on the scale of the plots of FIGS. 10A and 10B represent example output performance of an angularly-separated pair of illumination devices 10 having the reflectors 14 described herein. Each of the illumination devices 10 includes one LED that provides an output of 1.27 Watts of optical power. Thus, the plots show the combined optical power of the two LEDs (2.54 W) of the pair of illumination devices 10 redistributed into a FOI using the two LEDs aligned in two corresponding angularly-separated illumination devices 10. With regard to FIG. 9, an example camera system 46 using 940 nm LEDs may utilize four pairs (total of eight illumination devices 10) of these angularly separated illumination devices 10 in a 2×2+2×2 arrangement. On the other hand, an example camera system 46 using 850 nm LEDs may utilize 1 or 2 pairs (total of two or four illumination devices 10) of illumination devices 10 in a 1+1 or 2+2 arrangement due to increased QE/responsivity of the image sensor of the camera device 48 for 850 nm light compared to 940 nm light. It should be appreciated that each LED may support a range of LED drive current, and may thus have capability to provide output power within a corresponding range based on device efficacy. The LED device used in the examples shown in FIGS. 10A and 10B provides a typical output power of 1.27 W when driven with LED drive current of 1 Ampere (A), however current handling capability is typically a function of drive current and drive type (i.e. continuous versus pulsed), such that higher drive current may be used to drive LED to achieve higher optical output power, up to a thermal limit, by pulsing the light source instead of using a continuous DC drive level. In this manner, the illuminator may be used as a flash during camera exposure time and achieve a radiant intensity level required within the FOI for a particular application, and otherwise be turned off so as to optimize efficiency of usage while minimizing unused, or wasted, light power.

Figure 11:
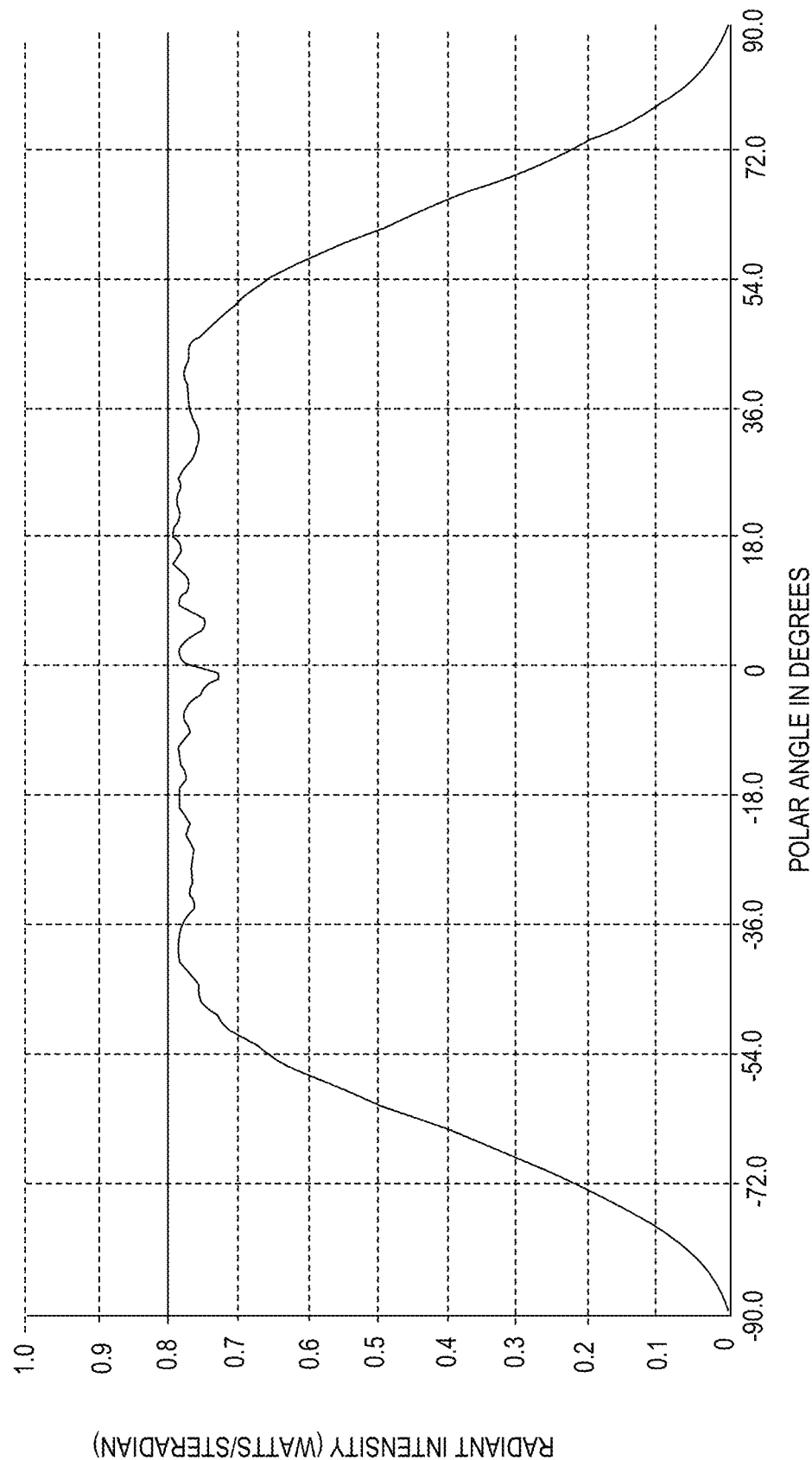
FIG. 11 shows an example radiant intensity measurement of a field of illumination emitted by the camera system of FIG. 8.

FIG. 11 shows an example measurement of the radiant intensity of a field of illumination 30 emitted by the illumination devices of the camera system 46. As shown, the example configuration of two sets of at least four illumination device 10 arranged with a separation angle between 32-34 degrees as discussed above provides a field of illumination 30 having a substantially uniform radiant intensity between the polar angles −54.0 degrees to 54 degrees. Thus, the field of illumination 30 of the two sets of at least four illumination devices 10 provides substantially uniform intensity of light in a field of illumination that covers a field of view of the camera device 48. Further, as the field of illumination is shaped by the rims 38 of the vertically and horizontally opposed symmetrical reflective surfaces 18A and 18B of each illumination device 10 has a substantially rectangular solid angle cone shape, the field of illumination 30 is substantially similar in shape to the field of view of the camera device 48. Thus, excess illumination that is outside of the field of view of the camera device 48 may be minimized, providing the potential benefit of reduce energy consumption and reduced heat generation for the camera system 46.

The following paragraphs provide additional support for the claims of the subject application. One aspect provides an illumination device comprising a light source configured to emit high angle light, moderate angle light, and direct angle light. The high angle light is emitted from the light source at a larger angle than the moderate angle light, and the moderate angle light is emitted from the light source at a larger angle than the direct angle light. The illumination device further comprises a reflector having a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, and a second region that is convex. For each of the vertically and horizontally opposed symmetrical reflective surfaces, the first region is formed proximate to a mounting location of the light source, the first region being positioned to reflect high angle light emitted from the light source. For each of the vertically and horizontally opposed symmetrical reflective surfaces, the second region is formed on a distal side of the first region relative to the mounting location of the light source, the second region being positioned to reflect moderate angle light emitted from the light source. In this aspect, additionally or alternatively, each of the vertically and horizontally opposed symmetrical reflective surfaces may be further formed so as to have a third region that terminates in a rim. In this aspect, additionally or alternatively, for each of the vertically and horizontally opposed symmetrical reflective surfaces, the rim may be formed on a distal side of the second region relative to the mounting location of the light source. In this aspect, additionally or alternatively, for each of the vertically and horizontally opposed symmetrical reflective surfaces, the rim may be shaped to frame directly emitted light from the light source mounted within the reflector into a substantially rectangular solid angle cone. In this aspect, additionally or alternatively, the reflector may redistribute light emitted from the light source such that the illumination device outputs a field of illumination having a substantially uniform intensity of light. In this aspect, additionally or alternatively, the field of illumination output from the illumination device may have a substantially uniform intensity of light between a distance of 0.3 m and 5.0 m from the illumination device. In this aspect, additionally or alternatively, the rim may be shaped based on a biconic surface that is defined by the sag equation:

$$z = \frac{c_x x^2 + c_y y^2}{1 + \sqrt{1 - (1 + k_x)c_x^2 x^2 - (1 + k_y)c_y^2 y^2}}, \text{ where } c_x = \frac{1}{R_x}, c_y = \frac{1}{R_y}.$$

In this aspect, additionally or alternatively, the illumination device may further comprise a lenticular optical diffuser that is located at a position opposing the light source and the reflector such that light emitted from light source and reflected by the reflector passes through the lenticular optical diffuser. In this aspect, additionally or alternatively, the lenticular optical diffuser may have a full width at half maximum between 20 degrees to 30 degrees. In this aspect, additionally or alternatively, the light source may be configured to emit infrared light.

Another aspect provides a camera system comprising a camera device, and at least one illumination device comprising a light source configured to emit high angle light, moderate angle light, and direct angle light, the high angle light being emitted from the light source at a larger angle than the moderate angle light, and the moderate angle light being emitted from the light source at a larger angle than the direct angle light. The illumination device further comprises a reflector having a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, and a second region that is convex. For each of the vertically and horizontally opposed symmetrical reflective surfaces the first region is formed proximate to a mounting location of the light source, the first region being positioned to reflect high angle light emitted from the light source. For each of the vertically and horizontally opposed symmetrical reflective surfaces the second region is formed on a distal side of the first region relative to the mounting location of the light source, the second region being positioned to reflect moderate angle light emitted from the light source. The at least one illumination device is arranged to emit a substantially uniform field of illumination that covers a field of view of the camera device. In this aspect, additionally or alternatively, the camera system may further comprise at least two sets of illumination devices that are arranged such that a separation angle between a first direction of illumination of a first set of illumination devices and a second direction of illumination of a second set of illumination devices is between 32 degrees to 34 degrees. In this aspect, additionally or alternatively, each set of illumination devices may include at least four illumination devices that are arranged in a grid along a plane. In this aspect, additionally or alternatively, the camera system may further comprise a lenticular optical diffuser that is located at a position opposing the light source and the reflector such that light emitted from light source and reflected by the reflector passes through the lenticular optical diffuser. In this aspect, additionally or alternatively, each of the vertically and horizontally opposed symmetrical reflective surfaces of the at least one illumination device may be further formed so as to have a third region that terminates in a rim. In this aspect, additionally or alternatively, for each of the vertically and horizontally opposed symmetrical reflective surfaces of the at least one illumination device, the rim may be formed on a distal side of the second region relative to the mounting location of the light source. In this aspect, additionally or alternatively, for each of the vertically and horizontally opposed symmetrical reflective surfaces of the at least one illumination device, the rim may be shaped to frame directly emitted light from the light source mounted within the reflector into a substantially rectangular solid angle cone. In this aspect, additionally or alternatively, the field of illumination output from the at least one illumination device may have a substantially uniform intensity of light between a distance of 0.3m and 5.0m from the illumination device. In this aspect, additionally or alternatively, the rim may be shaped based on biconic surface that is defined by the sag equation:

$$z = \frac{c_x x^2 + c_y y^2}{1 + \sqrt{1 - (1 + k_x)c_x^2 x^2 - (1 + k_y)c_y^2 y^2}}, \text{ where } c_x = \frac{1}{R_x}, c_y = \frac{1}{R_y}.$$

Another aspect provides a reflector comprising a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, and a second region that is convex, and a third region that terminates in a rim. For each of the vertically and horizontally opposed symmetrical reflective surfaces, the first region is formed proximate to an open area of the reflector, the second region is formed on a distal side of the first region relative to open area of the reflector, and the rim is formed on a distal side of the second region relative to the open area of the reflector.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An illumination device, comprising:
 a light source configured to emit high angle light, moderate angle light, and direct angle light, the high angle light being emitted from the light source at a larger angle than the moderate angle light, and the moderate angle light being emitted from the light source at a larger angle than the direct angle light; and
 a reflector having a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, a second region that is convex, and a third region that terminates in a rim;

wherein for each of the vertically and horizontally opposed symmetrical reflective surfaces:
the first region is formed proximate to a mounting location of the light source, the first region being positioned to reflect high angle light emitted from the light source;
the second region is formed on a distal side of the first region relative to the mounting location of the light source, the second region being positioned to reflect moderate angle light emitted from the light source; and
the third region is formed such that a shape of the rim defines a non-planar surface, the third region being positioned and shaped to reflect directly emitted light from the light source mounted within the reflector into a substantially rectangular solid angle cone.

2. The illumination device of claim 1, wherein the rim is shaped based on a biconic surface that is defined by the sag equation:

$$z = \frac{c_x x^2 + c_y y^2}{1 + \sqrt{1 - (1+k_x)c_x^2 x^2 - (1+k_y)c_y^2 y^2}} \text{ where } c_x = \frac{1}{R_x}, c_y = \frac{1}{R_y}.$$

3. The illumination device of claim 1, wherein the light source is configured to emit infrared light.

4. The illumination device of claim 1, further comprising a lenticular optical diffuser that is located at a position opposing the light source and the reflector such that light emitted from light source and reflected by the reflector passes through the lenticular optical diffuser.

5. The illumination device of claim 4, wherein the lenticular optical diffuser has a full width at half maximum between 20 degrees to 30 degrees.

6. The illumination device of claim 1, wherein for each of the vertically and horizontally opposed symmetrical reflective surfaces, the rim is formed on a distal side of the second region relative to the mounting location of the light source.

7. The illumination device of claim 6, wherein the reflector redistributes light emitted from the light source such that the illumination device outputs a field of illumination having a substantially uniform intensity of light.

8. The illumination device of claim 7, wherein the field of illumination output from the illumination device has a substantially uniform intensity of light between a distance of 0.3m and 5.0m from the illumination device.

9. A reflector comprising:
a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, and a second region that is convex, and a third region that terminates in a rim;
wherein for each of the vertically and horizontally opposed symmetrical reflective surfaces:
the first region is formed proximate to an open area of the reflector; and
the second region is formed on a distal side of the first region relative to open area of the reflector; and
the rim is formed on a distal side of the second region relative to the open area of the reflector, and the rim is shaped based on a biconic surface relationship that is defined by the sag equation:

$$z = \frac{c_x x^2 + c_y y^2}{1 + \sqrt{1 - (1+k_x)c_x^2 x^2 - (1+k_y)c_y^2 y^2}}, \text{ where } c_x = \frac{1}{R_x}, c_y = \frac{1}{R_y}.$$

10. The reflector of claim 9, wherein the rim is shaped to frame directly emitted light from a light source mounted within the reflector into a substantially rectangular solid angle cone.

11. The reflector of claim 10, wherein the reflector redistributes light emitted from the light source to output a field of illumination having a substantially uniform intensity of light.

12. A camera system comprising:
a camera device;
at least two sets of illumination devices that are arranged with a separation angle between a first direction of illumination of a first set of illumination devices and a second direction of illumination of a second set of illumination devices, wherein the separation angle is between 32 degrees to 34 degrees;
each illumination device of the at least two sets of illumination devices comprising:
a light source configured to emit high angle light, moderate angle light, and direct angle light, the high angle light being emitted from the light source at a larger angle than the moderate angle light, and the moderate angle light being emitted from the light source at a larger angle than the direct angle light; and
a reflector having a pair of vertically opposed symmetrical reflective surfaces and a pair of horizontally opposed symmetrical reflective surfaces, each of the vertically and horizontally opposed symmetrical reflective surfaces being formed according to a local surface slope and redirection relationship so as to have a first region that is concave, and a second region that is convex;
wherein for each of the vertically and horizontally opposed symmetrical reflective surfaces:
the first region is formed proximate to a mounting location of the light source, the first region being positioned to reflect high angle light emitted from the light source; and
the second region is formed on a distal side of the first region relative to the mounting location of the light source, the second region being positioned to reflect moderate angle light emitted from the light source; and
wherein the at least two sets of illumination devices are arranged to emit a substantially uniform field of illumination that covers a field of view of the camera device.

13. The camera system of claim 12, wherein each set of illumination devices includes at least four illumination devices that are arranged in a grid along a plane.

14. The camera system of claim 12, further comprising:
a lenticular optical diffuser that is located at a position opposing the light source and the reflector of the at least two sets of illumination devices such that light emitted from light source and reflected by the reflector passes through the lenticular optical diffuser.

15. The camera system of claim 12, wherein the field of illumination output from the at least two sets of illumination devices has a substantially uniform intensity of light between a distance of 0.3m and 5.0m from the illumination device.

16. The camera system of claim 12, wherein each of the vertically and horizontally opposed symmetrical reflective surfaces of each illumination device are further formed so as to have a third region that terminates in a rim.

17. The camera system of claim 16, wherein the rim is shaped based on a biconic surface that is defined by the sag equation:

$$z = \frac{c_x x^2 + c_y y^2}{1 + \sqrt{1 - (1+k_x)c_x^2 x^2 - (1+k_y)c_y^2 y^2}} \text{ where } c_x = \frac{1}{R_x}, c_y = \frac{1}{R_y}.$$

18. The camera system of claim 16, wherein for each of the vertically and horizontally opposed symmetrical reflective surfaces of each illumination device, the rim is formed on a distal side of the second region relative to the mounting location of the light source.

19. The camera system of claim 18, wherein for each of the vertically and horizontally opposed symmetrical reflective surfaces of each illumination device, the rim is shaped to frame directly emitted light from the light source mounted within the reflector into a substantially rectangular solid angle cone.

* * * * *